United States Patent [19]
McGovern et al.

[11] Patent Number: 5,918,207
[45] Date of Patent: Jun. 29, 1999

[54] PROCESS AND SYSTEM FOR PREDICTIVE RESOURCE PLANNING

[75] Inventors: John McGovern, Plano, Tex.; George A. Gulyas, Whitby; Michael B. Dickey, Nepean, both of Canada

[73] Assignee: Electronic Data Systems Corporation, Plano, Tex.

[21] Appl. No.: 08/641,656

[22] Filed: May 1, 1996

[51] Int. Cl.$^6$ .................................................. G06F 17/60
[52] U.S. Cl. ...................... 705/1; 705/8; 705/9; 364/468
[58] Field of Search ...................... 705/1, 8, 9; 364/468

[56] References Cited

U.S. PATENT DOCUMENTS

| | | | |
|---|---|---|---|
| 4,937,743 | 6/1990 | Rassman et al. | 705/8 |
| 5,093,794 | 3/1992 | Howie et al. | 364/468 |
| 5,164,897 | 11/1992 | Clark et al. | 705/1 |
| 5,467,268 | 11/1995 | Sisley et al. | 705/9 |
| 5,737,728 | 4/1998 | Sisley et al. | 705/9 |

Primary Examiner—Allen R. MacDonald
Assistant Examiner—Jagdish Patel
Attorney, Agent, or Firm—Anthony E. Peterman; L. Joy Griebenow

[57] ABSTRACT

A process and system for predictive resource planning to allow a service provider to meet a customer's predicted technical resource requirements. The process involves determining (11) a service provider's technology baseline, determining (12) a customer's technology direction, and storing the data representing the technology baseline and the technology direction in a data base repository. Based on the technology direction of the customer, the customer's technical resource requirements are predicted (13) and stored in the data base repository. The service provider then documents (14) the skill levels of its candidate employees and selects (15) candidates to meet the predicted technical resource requirements. The service provider creates (16) individual development plans for any candidates needing skills developed to meet the customer's technical resource requirements and implements (17) these individual development plans to develop the skills of the selected candidates in order to meet the predicted technical resource requirements of the customer.

19 Claims, 7 Drawing Sheets

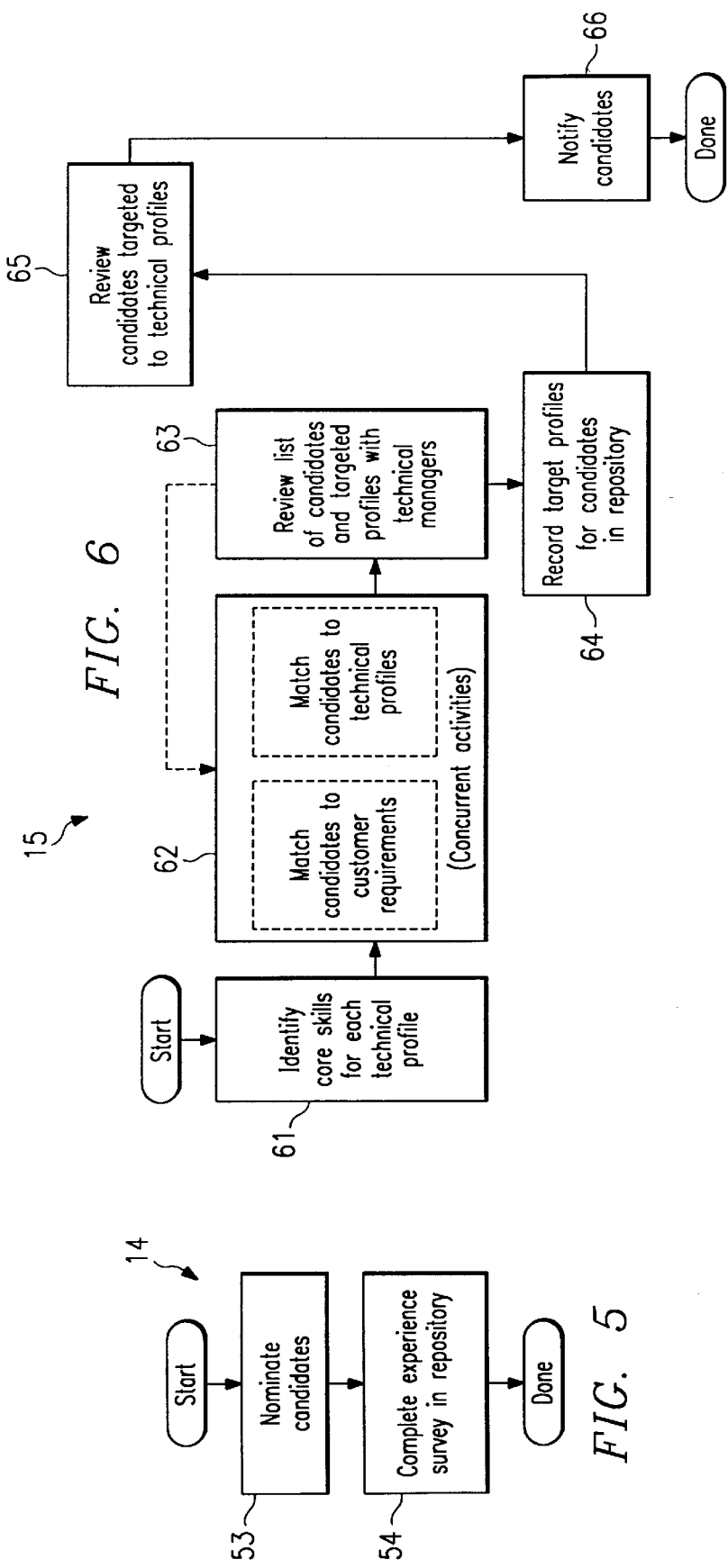

5,918,207

PROCESS AND SYSTEM FOR PREDICTIVE RESOURCE PLANNING

TECHNICAL FIELD OF THE INVENTION

The present invention relates in general to the field of resource management and, more particularly, to a process and system for predictive resource planning to meet a customer's or series of customers' predicted technical resource requirements.

BACKGROUND OF THE INVENTION

Business strategies often require planning well in advance of implementation. Many companies use service providers to provide skilled personnel for use in implementing those companies' respective business plans, because many service providers have a vast array of technically trained personnel from which to staff business strategies. One key to successful implementation of a business plan involves successfully predicting the resources, such as appropriately trained personnel, needed to carry out the business plan and implementing a strategy to ensure those resources will be in place when needed.

It is important to accurately predict the technical resources needed to carry out a future business plan for either an internal or external customer. Typically, such resource planning involves analyzing the business needs of a customer, determining the skills required for the business plan of the customer, and training personnel, as necessary, in the skills needed to implement the business plan. However, conventional methods of resource planning have many limitations.

Conventional methods of resource planning typically require performing manual searches for skilled resources and analysis and can prove time consuming and costly. Conventional methods are especially problematic if the market analysis is extensive, the service provider has a vast number of candidates to search, or the customer needs highly specialized or large numbers of skilled personnel. A service provider having a large number of skilled candidates from which to fill a customer's needs can find conventional manual methods burdensome. This time consuming effort can result in a service provider not being able to provide the correct number of personnel, with the correct skill levels, within the time available for meeting the customer's needs. In other words, due to process limitations, service providers often are unable to provide right people with the right skills at the right time.

Conventional methods of resource planning involve manually searching a personnel base to match appropriately qualified candidates to the technical resource requirements of the customer. Such technical resource requirements can include, for example, a pool of personnel that have the technical skills needed to service a customer's needs. After candidates are matched to the customer's needs, deficiencies in other skills may remain. Conventional methods for selecting candidates to meet a customer's technical resource requirements can not easily or efficiently identify these deficiencies. Because conventional methods for providing personnel to met customers' needs and accommodate future business plans do not effectively compare candidates' skill levels to the customer's needs, the service provider may have personnel assigned to a customer who are lacking essential skills to perform the service required by the customer. Conventional methods for resource planning are reactive and do not effectively provide training plans to enhance potential candidates' skills within the time available to meet the customer's technical resource requirements.

SUMMARY OF THE INVENTION

The present invention provides a process and system for predictive resource planning that substantially eliminate or reduce disadvantages and problems associated with previously developed methods of resource planning.

According to one embodiment of the present invention, a process is provided for predictive resource planning to allow a service provider to meet a customer's predicted technical resource requirements. The process is implemented using a computer having a data storage device for storing data in a data base repository. The process involves determining a service provider's technology baseline, determining a customer's technology direction, and storing the data representing the technology baseline and the technology direction in the data base repository. Based on the technology direction of the customer, the customer's technical resource requirements are predicted and stored in the data base repository. The service provider then assesses the skill levels of its candidates and selects candidates for providing the predicted technical resource requirements. The service provider creates individual development plans to develop skills of selected candidates as needed to provide the predicted technical resource requirements. The service provider then implements these individual development plans to develop the skills of the selected candidates in order to meet the predicted technical resource requirements of the customer.

A technical advantage of the present invention is that it allows a service provider to anticipate and develop within its work force the technical skills and capabilities required to meet its customers' business needs by providing the customer with personnel having the correct skills at the right time.

The present invention provides another technical advantage by allowing a service provider to better position itself to meet current and future customer technical service needs.

The present invention provides a further technical advantage by establishing a repeatable process for anticipating and developing critical skills within the service provider's technical work force.

Another technical advantage of the present invention is that it allows resource planning: providing already properly trained personnel more rapidly and cost effectively and providing a re-skilling plan to train candidates to the skill level required by the customer within the customers' required time frame.

The present invention provides an additional technical advantage by allowing automatic searches of numerous candidates' skill levels to match candidates to the customer's technical skill needs. By presenting a candidate list, intended to meet a customer's skill requirements, in a sequence ranging from most to least qualified, the present invention allows a service provider to immediately assess its ability to meet a customer's requirements in a given time frame. The present invention also reduces the time involved in identifying the best suited candidates by allowing a quick ranking relative to a customer's needs without having to return to a review of resume's and risk misinterpreting certain skills.

BRIEF DESCRIPTION OF THE DRAWINGS

A more complete understanding of the present invention and the advantages thereof may be acquired by referring to the following description taken in conjunction with the accompanying drawings in which like reference numerals indicate like features and wherein:

FIG. 5 is a flow diagram of one embodiment of documenting candidate skill levels of FIG. 1;

FIG. 6 is a flow diagram of one embodiment of selecting conditions of FIG. 1;

DETAILED DESCRIPTION OF THE INVENTION

The present invention provides a process and system for predictive resource planning and implementing a structured training process to enable a service provider to anticipate and develop the service provider's personnel to meet the predicted business requirements of a customer based on the customer's technology direction. This predictive resource planning process can help a service provider establish new business and more effectively service both current and new business by ensuring timely availability of adequately trained personnel. The predictive resource planning process allows the service provider to anticipate, based on the customers' current and future business and technology needs, the technical skills the service provider's personnel will need to meet the customer's requirements over the planning period, such as the next eighteen months to five years. Information in the repository can also be used to analyze trends in technology needs and to skill to those needs as an alternative to skilling for a specific customer. Because not all customers reflect signed business, this reduces the cost and risk to a service provider by allowing an analysis of trends in requirements The predictive resource planning method and system of the present invention includes a software tool executable on a computer having a data storage device for automatically implementing steps in the predictive resource planning process. The system stores information necessary to support the predictive resource planning processes into a repository of data such as a relational database, searches and compares that data, selects candidates based on criteria, provides information necessary to equate re-skilling needs with training courses available, and creates individual development plans as well as a variety of reports.

In one embodiment of the present invention, the software tool supports many predictive resource planning functions. The software tool stores information necessary to support the predictive resource planning process and stores this stored information in a relational database. Once information is stored in the database, the software tool can search, based on customer skill requirements or profiles, to find candidates to fulfill specific needs of the customer. The predictive resource planning software tool also allows the service provider to match candidates for re-skilling against customer needs. The software tool can also access the database to compile a variety of reports including a report on the future employee development needs of the service provider. The software tool also allows a service provider to deploy the database to remote sites and allows information to be merged from multiple remote sites. One embodiment of the software tool has a WINDOWS based interface using a MICROSOFT ACCESS 2.0 DATABASE MANAGEMENT SYSTEM. Reports in this embodiment are developed using a CRYSTAL REPORTS 4.0 report creation product.

Figure 1:
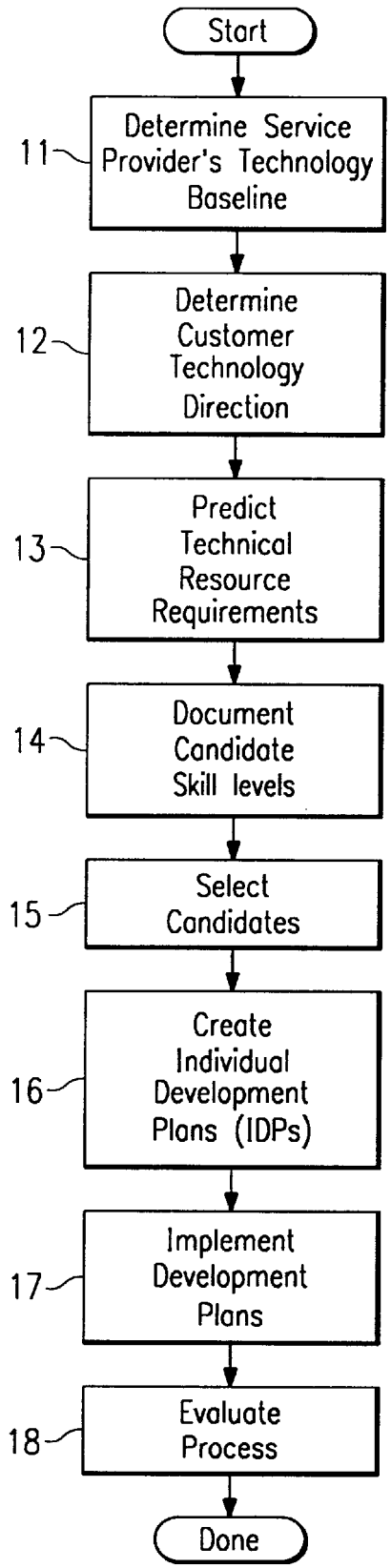
FIG. 1 is a flow diagram of one embodiment of a process for predictive resource planning according to the present invention.

FIG. 1 is a flow diagram of one embodiment of a predictive resource planning process. Each of the steps shown in FIG. 1 are shown and described in more detail with respect to FIGS. 2–9 according to the teachings of the present invention.

Predictive resource planning is accomplished by a service provider and includes determining a service provider's technology baseline in step 11. The technology baseline represents the service provider's technical skills and capabilities based, in part, upon the skills of its personnel and the skills it deems necessary to meet market demands in the future. The technology baseline can be updated periodically.

In step 12, the service provider determines a customer's technology direction representing where the customer will be with respect to technology in the future. A customer's technical direction will also represent what type of technical skills the service provider will need to provide in order to meet the customer's technology and business needs. This evaluation can be done by industry, by market segment, and by specific customer. This technology direction is stored in a repository of data, along with the technology baseline, and allows the service provider to understand and summarize both market segment and customer information. For example, in a manufacturing sector, a service provider can have "x" number of customers with "y" kinds of computer platforms, which can be defined by tool name at the product level. The technology direction also allows the service provider to know whether a customer is staying with various technology platforms or migrating to a different tool in a specified time frame. The repository of data allows a service provider to synthesize this information to understand how many customers in a market segment, for example, are using certain tools and in what time frame the tools are to be implemented.

In step 13, based on the information stored in the previous steps, the service provider can predict and store a customer's technical resource requirements. Step 13 involves, in part, identifying the number, type, and skill level of technical personnel required to meet the customers' business needs, and the time frame within which the technical personnel need to be available to meet the customer's needs.

The service provider then documents and stores the skill level of candidates from the service provider's candidate pool in step 14. The service provider's candidate pool frequently consists of employees who typically have varying technical knowledge and skill levels. The technical knowledge and skills involve specific products, platforms, methods technologies, and software programs and can be defined down to the tool level. For example, if a customer needs to develop graphical interfaces, the service provider can determine what kinds of tools are needed for that development and what personnel exist (or need to be trained) to provide that graphical interface development. In step 15, the service provider selects candidates within the candidate pool to be used to meet the customer's technical resource requirements. This step typically involves matching candidates with skills most compatible with the customer's needs. It should be understood that steps 11 through 15 can be done concurrently.

The service provider then develops individual development plans in step 16 to develop technical skills of candidates, as needed, in order to meet the technical resource requirements of the customer. Some candidates may not need any additional skill development, whereas others may need some skill development. The individual development plans list specific development activities and projected time frames for completion of those activities. In step 17, implementation of the individual development plans allows the service provider to train the candidates and develop the appropriate skill levels within the appropriate time frame. Successful completion of steps 11 through 17 will give the service provider a pool of properly trained technical personnel to support the customer's technical resource requirements as predicted in step 13. In step 18, the service provider conducts an evaluation process to determine ways to improve the predictive resource planning process.

Determine Service Provider Technology Baseline

Figure 2:
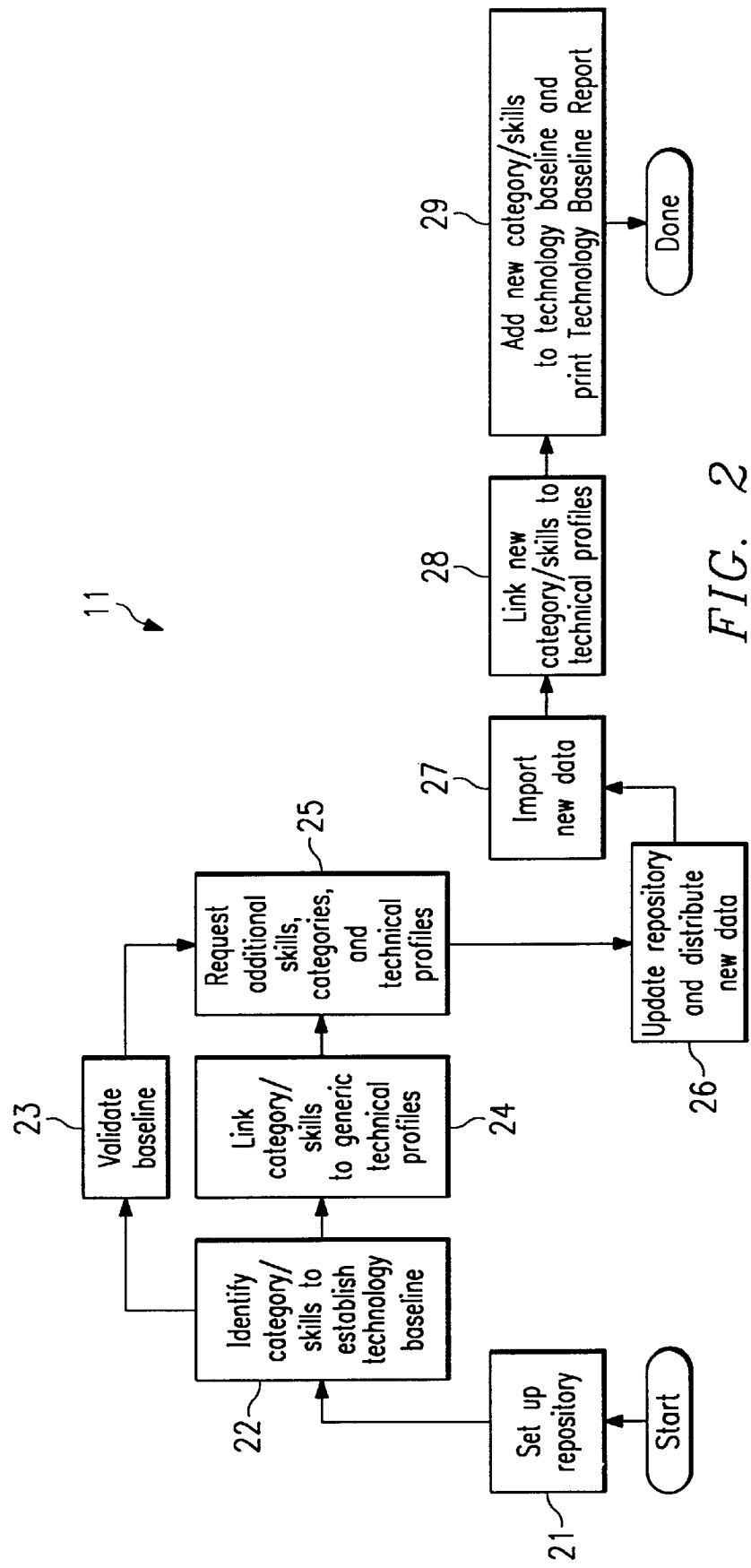
FIG. 2 is a flow diagram of one embodiment of determining a service provider technology baseline of FIG. 1.

FIG. 2 is a flow diagram of one embodiment of determining a service provider technology baseline of step 11 of FIG. 1. A service provider can be an entire business organization or can be an independent strategic or business unit within a larger organization. Thus, the service provider can service internal or external customers.

Step 21 of FIG. 2 involves setting up a repository of data, such as a relational data base, to hold the various information collected and manipulated during the predictive resource planning process. For example, a repository administrator can load the repository according to the needs of the service provider (for example, a stand alone versus a LAN set-up). The repository administrator can also establish security sign-on records for the predictive resource planning project team members. Initially, technical profiles can be loaded into the repository. Technical profiles represent a list or set of skills a person should possess to qualify for a particular task. For example, one generic technical profile might be a UNIX programmer. The technical profile for a UNIX programmer would list skills required to qualify as a UNIX programmer.

In step 22, to establish the service provider technology baseline, the technical skills and categories of personnel within a strategic unit are identified to establish the service provider's technology baseline. A skill represents the ability to use a product, tool, software program, or other component within a technology. The service provider can establish this technology baseline through business plans, technology reports, and employee discussions. Identification of the technology baseline can begin with a project manager using a category/skills report generated from the repository to identify those technical category/skills (or technologies) currently in use within the service provider, currently supported because of the service provider's customer requirements, or anticipated because of known future technical directions of the service provider. This information provides the foundation for the service provider technology baseline. Any technical categories/skills not currently on the category/skills report can be added during step 22. The service provider technology baseline establishes a template for gathering customer business and technology requirements later in the predictive resource planning process. Determining the service provider technology baseline can also include evaluating technologies pervasive in the service provider's industry served by the service provider. Determining the service provider technology baseline can include, in step 23, validating the technology baseline to ensure proper documentation of the current and future technical direction of the service provider. This validation can be performed, for example, by a guidance team.

In step 24, category/skills are linked to generic technical profiles. For example, either a software tool or the project manager and lead technologist can review the technical profiles loaded into the repository to determine which technical profiles match the technologies within the service provider. Each technology within the service provider and the skills associated with that technology are linked to a skill set within a technical profile. Thus, links defining the categories/skills available within the service provider are established. These category/skill links to technical profiles are used later in the predictive planning process to determine customers' technical resource requirements based on selected skill requirements and to identify which categories/skills to inquire about on employee experience surveys.

In step 25, additional skills, categories, and technical profiles are requested in order to update information developed in steps 23 and 24. Step 25 involves generating a list of categories, skills, and technical profiles that do not currently exist and should be added to the repository to fully describe the service provider's technology baseline. Eventually, all categories/skills within a service provider can be linked to a generic technical profile. A service provider's personnel can accomplish step 25, for example, by completing worksheets and transmitting the worksheets electronically or via fax to a repository administrator or other person responsible for updating repository information. The predictive resource planning software tool can generate this predictive resource planning worksheet and allow transmittal electronically.

In step 26, the repository is updated and new data is distributed, for example, a repository administrator can document the service provider requests for repository updates and review the requests to determine whether the requested items already exist in the repository (for example, under a different technical profile name). For example, the categories/skills of a service provider not previously linked to a technical profile might exist under a technical profile not previously identified. Any service provider categories/skills not linked to a technical profile are added to the predictive resource planning repository.

In step 27, new data is imported into the repository. Any new data loaded will be imported into the service provider's repository using, for example, a transfer utility provided by the software tool.

In step 28, new category/skills are linked to technical profiles. For example, a repository administrator can link newly imported categories and skills to appropriate technical profiles.

When all technical skills and categories are linked with technical profiles, new category/skills are added to the service provider technology baseline in step 29. This completes the determination of the service provider technology baseline. The technology baseline is stored in the predictive resource planning repository. In step 29, a predictive resource planning software tool can allow the service provider to print a report describing the categories/skills and technical profiles within the service provider technology baseline. It should be understood that the service provider's technology baseline can be periodically updated by repeating steps 21 through 29.

Determine Customer Technology Direction

Figure 3:
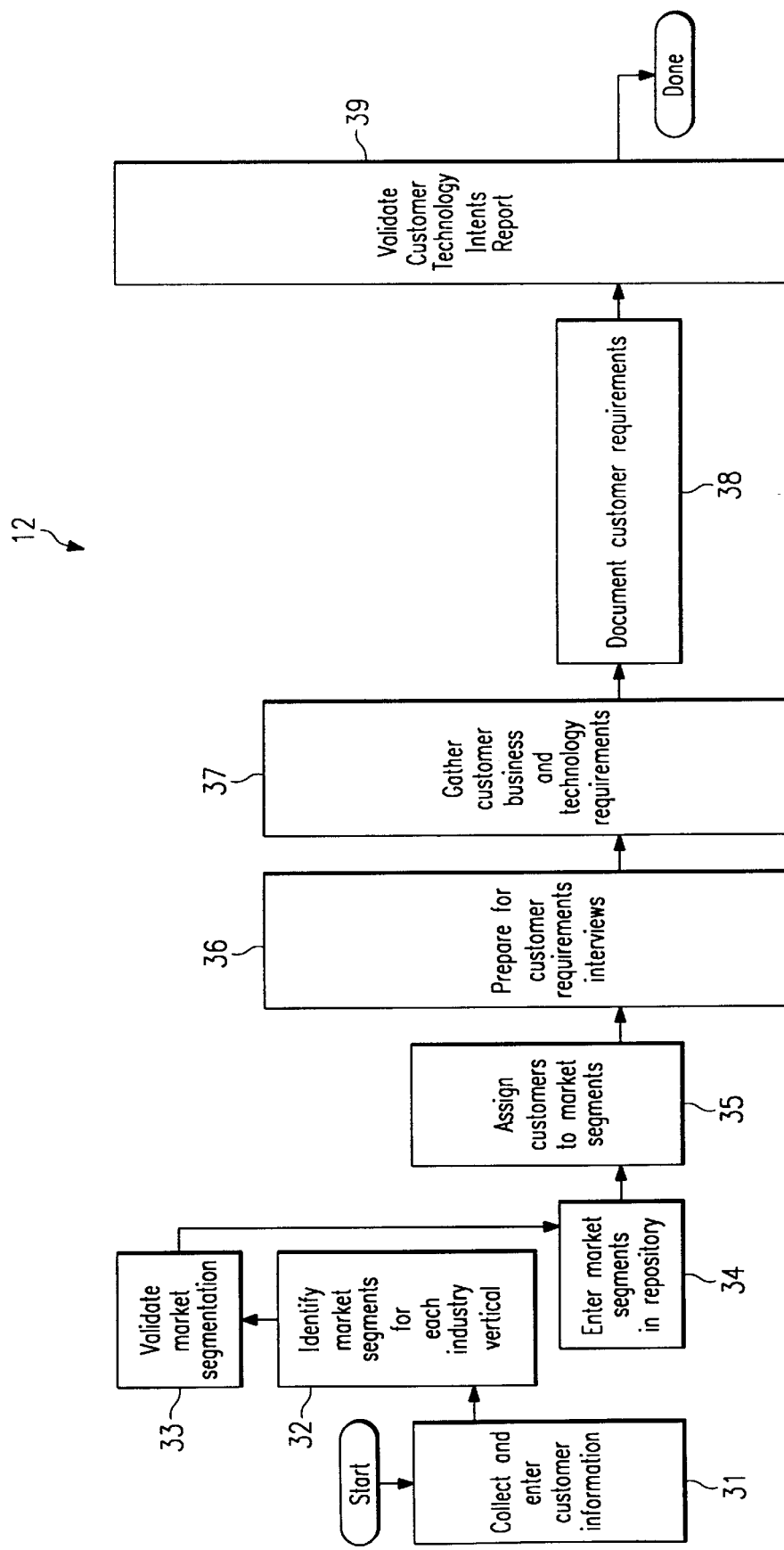
FIG. 3 is a flow diagram of one embodiment of determining a customer technology direction of FIG. 1.

FIG. 3 is a flow diagram of one embodiment of determining customer technology direction of step 12 of FIG. 1.

In step 31, customer information is collected and entered into the repository. For example, managers can collect customer information on each customer supported by a service provider from a customer contact and enter this information into the repository. A manager can be the customer contact or any other manager. The service provider's customer contact should be a person responsible for knowing that customer's business requirements. The information collected can include the name of the customer representative with whom the service provider can discuss the customer's needs.

The service provider may be organized such that a group or organization within the service provider serves one or several industry verticals. In step 32, market segments are identified for each industry vertical supported by the service provider. An industry vertical can represent a broad definition of the service provider's customer base, such as the financial, manufacturing, or government industries. A service provider can further define its customers by market segment, which describes the customers' specific type of business within the industry vertical. For example, a service provider serving the financial industry vertical could further define its customers by market segments of brokerage companies, large financial institutions, small financial institutions, and credit unions. Market segments may be areas where the service provider has few or no existing customers but known markets exist into which the service provider desires to grow.

The identified market segmentation can be validated in step 33 to ensure that the current and future service provider direction is properly documented. For example, this validation can be accomplished by a guidance team. The identified market segments are then loaded into the repository at step 34.

In step 35, the service provider assigns customers to market segments. Step 35 can include assigning a customer segment name to each individual customer market segment that describes the relationship between the customer and each identified market segment. For example, for a financial institution customer, the steps to define it could be as follows:

1. Assign the customer to the financial industry vertical.
2. Identify the customer's first market segment, e.g., small financial institutions.
3. Assign first customer segment name to be the name of the customer.
4. Identify the customer's second market segment, e.g., brokerage companies.
5. Assign second customer segment name to be the name of the customer's brokerage services.

In step 36, the service provider prepares for a customer requirements interview. For example, managers can use the service provider technology baseline to create an interview template for gathering customer business and technology requirements. These templates would provide a guide when gathering information to determine a customer's technology direction. These templates can be created automatically using a predictive resource planning software tool.

In step 37, customer business and technology requirements are gathered. This is an important part of the predictive resource planning process because the customer business and technology requirements drive the remaining decisions in the predictive resource planning process. Step 37 involves documenting the customer's current and planned uses of technology, including maintaining, increasing, or decreasing use of a skill or technology in the future. The service provider should gather information from a customer contact—a person best able to articulate the customer's interests and intents in relation to technologies. In some cases, this person would be the customer manager (s) within the service provider for that industry vertical. In other cases, it may be more appropriate to gather technology requirements directly from the customer. When contacting customers directly, the size of the industry vertical may dictate how to proceed. If an industry vertical is small enough, every customer can be contacted. If an industry vertical is large, a representative sampling method can approximate the entire customer technology direction.

A typical interview can begin with the customer contact explaining the customer's market, the business drivers influencing the customer's business, and the customer's current and future business direction. A customer's business direction may also encompass certain companies and/or technical products the customer wants to use (for example, if the customer prefers WINDOWS-based programs). For example, the customer may have business requirements or plans that require the customer to maintain NOVELL NETWARE but migrate to WINDOWS NT. The service provider then translates the customer's business and technology plans into technology requirements. For each technology in which the customer expresses an interest, the service provider documents whether those technologies are contained within the service provider technology baseline. If the customer technology direction includes technologies with categories and/or skills not included within the service provider technology baseline, the service provider repeats steps 25 through 29 of the process of FIG. 2 to update the technology baseline. Upon completion of step 37, the service provider should have an understanding of the customer technology direction for an industry vertical as well as the individual customer's technology requirements.

In step 38, the service provider stores in the repository the skills and categories requirements for each customer based upon the customer's express intent for each technology. A predictive resource planning software tool can allow the service provider to print a customer technology intent report from this information. This report summarizes the technical categories and skills (technology resources) needed by each customer. In step 39, the service provider can review the customer technology intent report to validate the information included on the report. At this point, the service provider can fill in any gaps in technologies required by any particular customer in an industry vertical. The service provider can also identify customer technology intents and directions not discussed during customer interviews and schedule follow-up interviews to gather more information as to whether the customer will require support in those technology areas in the future. Upon conclusion of step 39, the service provider has the validated customer technology direction and the categories/skills required for that technology direction.

It should be understood that the service provider technology baseline can be periodically updated by repeating steps 31 through 39.

Determine Technical Resource Requirements

Figure 4:
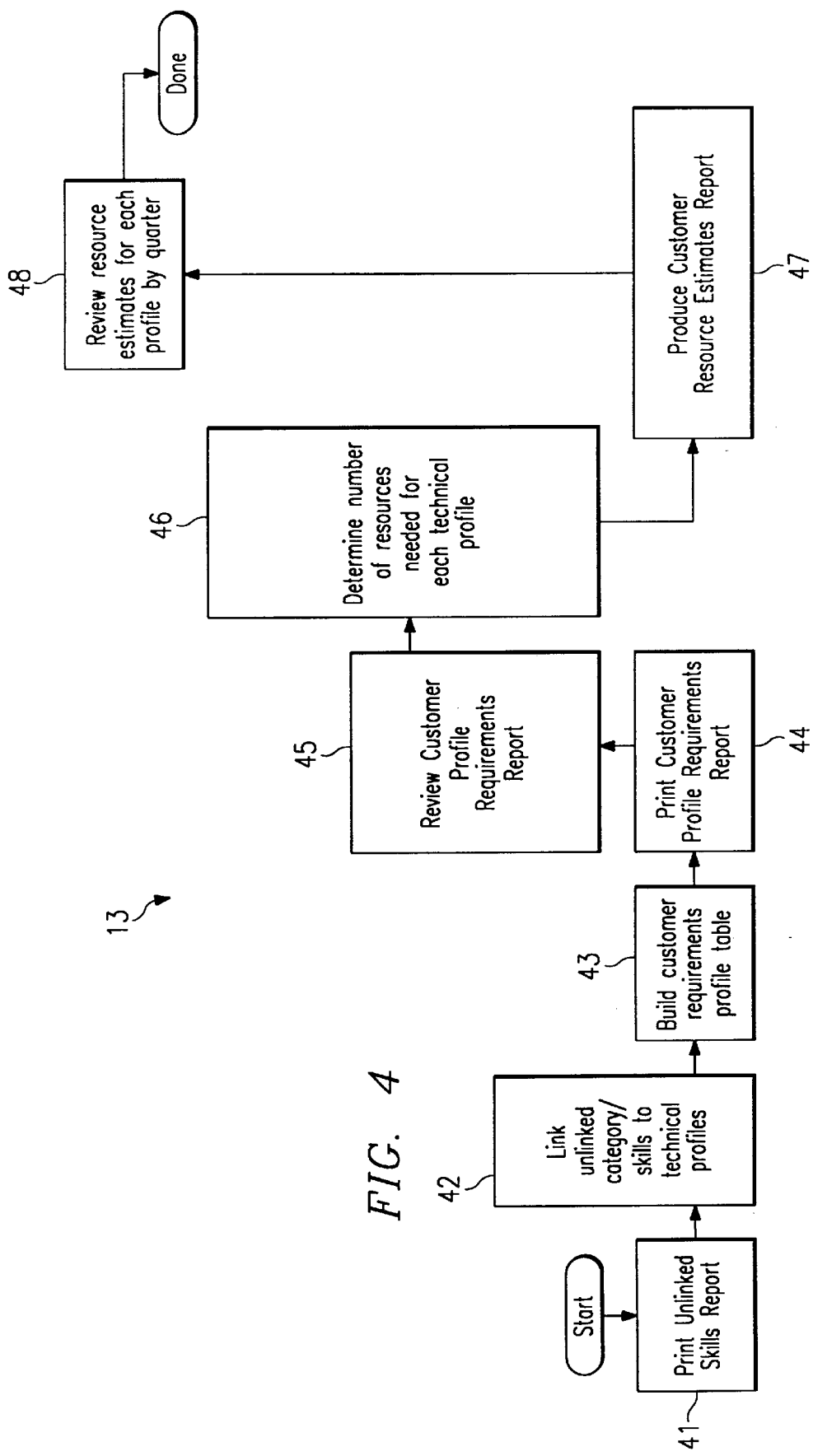
FIG. 4 is a flow diagram of one embodiment of predicting technical resource requirements of FIG. 1.

FIG. 4 is a flow diagram of predicting technical resource requirements of step 13 of FIG. 1. In step 41, an unlinked skills report is printed. For example, a repository administrator can print an unlinked category/skills report that identifies, for each customer, the categories and skills in which the customer indicated an interest that were not already linked to a technical profile in step 24 of FIG. 2. This identifies any unlinked skills/categories entered into the repository of data. In step 42, the unlinked category/skills are reviewed to determine whether to link those skills to a general technical profile. For example, one of the unlinked category/skills might be one in which the customer expressed a decreasing usage. The service provider may decide not to link this type of category/skill. On the other hand, one of the unlinked category/skills may be important to the customer, and the service provider would decide to link this category/skill. The unlinked skills that the service provider decides to link can be linked to the appropriate technical profile as determined, for example, by the lead technologist. The links are then recorded in the repository of data.

After the category/skills have been linked to technical profiles, a customer profile requirements table is built in step 43. This step can be accomplished, for example, by a repository administrator. This step could also be accomplished by a computer program. Building the customer profile requirements table updates the repository to create links between the customers' technology direction and the technical profiles needed to satisfy that technical direction. Once the table is built, the predictive resource planning software tool can allow the creation and printing of a customer profile requirements report in step 44. For each customer, this report identifies the categories and skills in which the customer indicated an interest and the potential technical profiles that may be required to provide those categories and skills.

In step 45, the customer profile requirements report is reviewed. For example, a lead technologist or project manager can review the customer profile requirements report for each customer and can determine the technical profiles needed to support the customers' business and technology requirements. Any technical profiles on the report that do not support the customers' business requirements can be eliminated.

In step 46, the service provider determines the number of resources, or personnel, needed for each technical profile. In this step, the service provider predicts the number of personnel needed for each technical profile to meet the customer's technical resource requirements. Based on the business environment forecast for some period into the future (typically forecast for the next six quarters), the service provider can predict the number of technical people required to support the customer technical resource requirements according to the customer technical profiles. In general, the service provider preferably evaluates the customer technical profile requirements, makes a judgment on how the industry will develop over some future time period, and makes a prediction on the number of technical personnel that will be needed to meet the customer's technical resource requirements. It should be understood that technical resources refer to employees of the service provider with technical skills who meet, or can be trained to meet the technological requirements of the customer.

Step 46 is a flexible stage of the predictive resource planning process in that determining the number of technical resources needed can be approached in various ways. The numbers of technical resources predicted can reflect the total resources required to support the customer's direction. In this way, an entire technical support group for that customer can be identified within the service provider. Alternatively, the technical resources predicted can represent only the number of resources requiring development, or training, in order to fulfill the customer's requirements. This alternative would identify those skill areas in which the service provider needs to train employees to meet the customer's requirements. A predicted technical resource requirement for the customer is documented for each customer technical profile. The predicted technical resource requirements provide numbers for the resources needed into the planned future period.

In step 47, the service provider produces a customer resource estimates report. In order to produce this report, the repository administrator can enter the resource estimates for each customer in the repository and produced a report of these estimates. This report identifies the number of resources needed for each technical profile for the time period forecast. In step 48, the service provider reviews resource estimates for each profile to understand the total resources needed to meet the customer's business technology requirements.

Documenting Candidate Skill Levels

FIG. 5 is a flow diagram of one embodiment of documenting candidate skill levels of step 14 of FIG. 1. In step 52, the service provider solicits candidate nominations. Technical managers nominate technical employees under their supervision as candidates for meeting the customer's technical resource requirements. A packet of nomination instructions to technical managers is distributed throughout the service provider. The packet, for example only, could contain the following items:

a cover letter signed by appropriate management;

an overview of the service provider's predictive resource planning process that describes the activities in the predictive resource planning process, the technical profiles defined for the service provider, the candidate nomination procedure, and a sample of a candidate technical experience survey;

instructions and nomination criteria (including aptitude, experience, and motivation criteria) for nominating candidates; and instructions for completing candidate technical experience surveys online.

Upon reviewing nomination instructions and criteria, candidates are nominated in step 53. This nomination can include technical managers completing electronic nomination forms. In step 54, the skill levels of the nominated candidates as provided by the completed experience surveys will be entered into the repository of data. The experience survey can also include a list of technologies, technical profile descriptions, and proficiency scale definitions. For each technical profile on the survey, candidates can indicate each category/skill that they possess. For each category/skill (technology) indicated, candidates can indicate their proficiency level for that technology, including the years of experience with the technology and how recently they have used that technology. Candidates can also enter information about their experience in the customer's industry and about which technical profiles they prefer. This is stored in the repository of data.

Select Candidates Task Summaries

FIG. 6 is a flow diagram of one embodiment of selecting candidates of step 15 of FIG. 1. In step 61, the service provider identifies core skills for each technical profile. The service provider determines, from the list of available skills linked to each technical profile, the most important, or core, skills that represent the highest priority skills for the customer technical profiles.

In step 62, the service provider matches candidates to customer requirements while concurrently matching candidates to technical profiles. The service provider looks for, in step 62, employees that most closely meet the customer's requirements. For example, a service provider can match candidates in two ways. First, the service provider can match candidates to the specific customer's requirements as outlined by the customer technical profiles. This fills the customer's need for a technical resource. Second, the service provider can match candidates to a generic technical profile. This allows the service provider to assess the proficiency level of the candidate on the skills within the technical profile. The predictive resource planning software tool then allows the service provider to run a search within the repository on candidates according to specified selection criteria such as a particular technical profile, proficiency level at a certain skill, or a minimum number of skills to match. The search can combine these, and other, search criteria to narrow the candidate selection pool. The step 62 matching process enables the service provider to identify potential candidates having a minimum level of core skills for a particular technical profile or specific customer requirement. If multiple candidates meet the initial search criteria, criteria can be narrowed. If desired, the service provider can also manually compare the candidates identified by a computer search to make a selection. Step 62 results in a list of candidates potentially targeted for a particular customer target profile.

In step 63, the service provider reviews the list of candidates and targeted profiles with technical managers. This provides an opportunity to explain to the technical manager why a candidate may be targeted for skills that differ from those for which the candidate expressed a preference. While step 63 is preferred, it is optional. For example, a lead technologist and the technical manager can discuss how the targeted profile will provide the candidate with opportunities to apply new skills and knowledge. Steps 62 and 63 can be an iterative process until satisfactory matches are found. Upon completion of steps 62 and 63, selected candidates will be targeted for a particular technical profile.

In step 64, the service provider records targeted profiles for candidates in the repository. For example, a repository administrator can record the selected candidates' targeted profiles. After the selected candidates have been targeted to technical profiles, the service provider can review the candidates by technical profile in step 65. In step 66, the service provider notifies candidates of their targeted technical profiles.

Create Individual Development Plans Task Summaries

Figure 7:
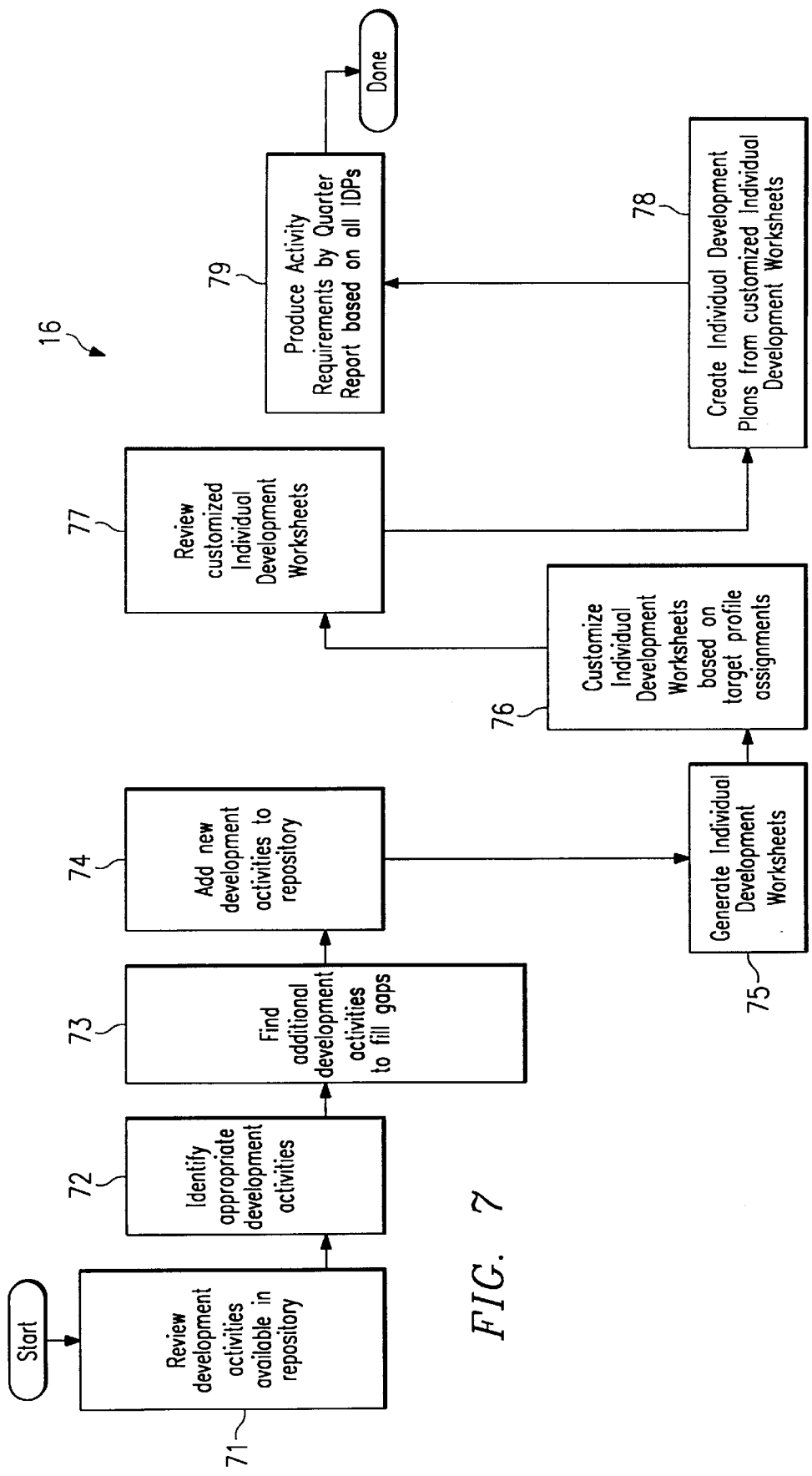
FIG. 7 is a flow diagram of one embodiment of creating individual development plans of FIG. 1.

FIG. 7 is a flow diagram of creating individual development plans (IDPs) of step 16 of FIG. 1. Candidate employees targeted to a particular technical profile often require additional training to meet all of the skills within that technical profile. The process of FIG. 7 involves developing a plan to train the candidates in the skills contained within the targeted technical profile. This training can include computer-based training, internal training courses, studying manuals, external training courses, and other forms of training.

In step 71, the service provider reviews development activities listed in the repository. The service provider (for example, the lead technologist, project manager, and human resources staff) can review the development activities available internally within the service provider. Based on the service provider technology baseline and the customer technical profiles, the service provider determines, in step 72, the appropriate category/skills for which development activities may be required. The service provider also can select which corporate development activities will appear on individual development plan worksheets.

Some categories/skills may not have development activities defined within the repository. In step 73, the service provider finds additional development activities to fill gaps. This can include the service provider identifying the development activities needed for those categories/skills that did not have development activities already defined. Sources of additional development activities can include such things as classes taught by local vendors, internal service provider training currently in use but not stored in the repository, project experience, tutoring, membership in professional organizations, self study courses, and books.

In step 74, the service provider adds new development activities to the repository. In one embodiment, the predictive resource planning software tool can automatically place all service provider development activities on individual development worksheets.

In step 75, the service provider generates individual development worksheets. This can include printing out individual development worksheets that include a candidate's technical experience data, target profile category/skill requirements, and the associated development activities for the target profiles. In step 76, the individual development worksheets of step 75 is customized based on the candidates' proficiency level in those category/skills required for the targeted profile. For example, for each development activity identified, the candidate and technical manager can agree on a target date for attending/executing the activity.

In step 77, the service provider reviews the customized worksheets for activities that may need to be added to the repository, including any activities added by the managers and candidates. Each development activity added from steps 73–75 is reviewed to determine whether it meets the content requirements of the category/skill, as well as other considerations such as cost and geographic location. If appropriate, new development activities are approved and added to the repository, repeating steps 73–76 as required. Completion of step 77 results in an approved customized individual development worksheet.

In step 78, the candidates create individual development plans (IDPs) based on the approved customized individual development worksheets. The individual development plans summarize each candidate's curriculum and target dates for completing the required development activities. The individual development plan provides a mechanism by which the service provider ensures that individual candidates have the required technical skills within the appropriate time frame to support the customer's technical resource requirements.

In step 79, the service provider produces an activity requirements report based on all individual development plans. In one embodiment, a software tool allows the service provider to generate an activity requirements report based on the development activity requirement of the individual development plans. This report summarizes the number of people who need to participate in a development activity and can provide the basis for scheduling development activities. In addition, this reduces the cost to a service provider's education department by proactively articulating class requirements.

Implement Development Plans Task Summaries

Figure 8:
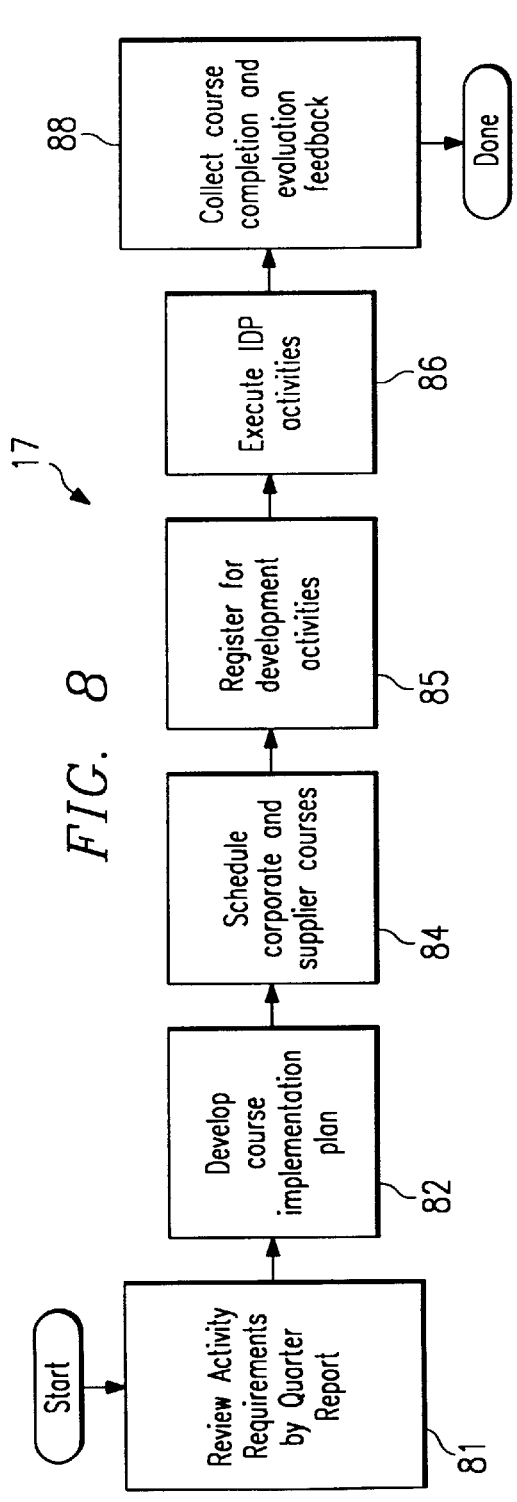
FIG. 8 is a flow diagram of one embodiment of implementing development plans of FIG. 1.

FIG. 8 is a flow diagram of implementing development plans of step 17 of FIG. 1. In step 81, the service provider reviews the dates of development activities to coordinate with corporate and external suppliers to ensure appropriate scheduling of the development activities. The service provider can also select between internal and external sources for providing development activities. Factors the service provider can consider include the cost of the training course, the number of employees who need the course, geographical location of the course, the duration of the course, and the availability/frequency of course offerings.

These determinations lead to step 82 in which the service provider develops a service provider course implementation plan. This plan can include a proposed schedule of dates for corporate and supplier courses, registration procedures, and projected cost information.

The service provider then schedules corporate and external supplier courses in step 84. In step 85, candidates register for developmental activities according to the time frames on their individual development plans. In step 86, candidates attend or participate in scheduled development activities in order to execute the individual development plan. Step 86 represents the stage during which the candidates complete the training activities to develop skills to meet their targeted technical profile. In step 88, the service provider can collect any candidate feedback and record the development activity completion by updating the candidates's individual development plan in the repository.

Evaluate the Predictive Resource Planning Process Task Summaries

Figure 9:
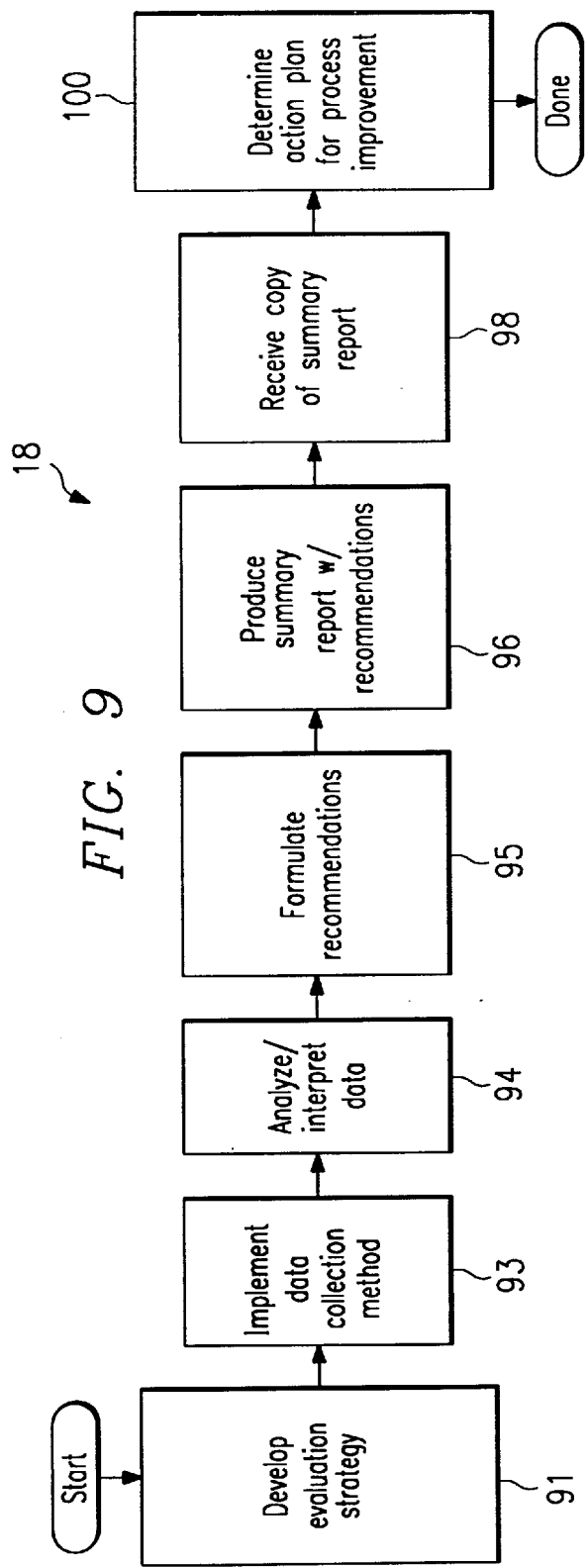
FIG. 9 is a flow diagram of one embodiment of evaluating the predictive resource planning process of FIG. 1.

FIG. 9 is a flow diagram of evaluating the predictive resource planning process of step 18 of FIG. 1. While preferred, step 18 is optional. The predictive resource planning evaluation strategy can be initiated and developed at the same time the predictive resource planning project plan is written. However, evaluation activities can also occur throughout the implementation of the predictive resource planning process.

In step 91, the service provider can develop an evaluation strategy based on the service provider's goals for implementing the predictive resource planning. The purpose of the evaluation plan is to determine if the stated objectives/goals for the predictive resource planning process were met so that the service provider can assess the effectiveness of the process and determine how to improve it. An evaluation plan, for example, can include:

Project goals and objectives;

Purpose of the evaluation;

Evaluation techniques and instruments;

Constraints of evaluation; and

Evaluation roles and responsibilities.

In step 93, the service provider implements the data collection method that includes specific instruction as to what data to collect, who collects that data, when the data gets documented, and how the data will be documented. As defined in the evaluation plan, the service provider analyzes and interprets the data in step 94.

Step 95 involves formulating recommendations based on the analysis of step 94. These recommendations suggest improvements to the predictive resource planning process.

Step 95 provides the basis for a summary report, developed in step 96, with recommendations for improving the predictive resource planning process. In step 98, a copy of the evaluation summary report is input into the repository in combination with other such reports from other predictive resource planning participants.

In step 100, the service provider determines and implements an action plan for predictive resource planning process improvement. The steps of FIG. 9 represent an iterative process.

In general, according to the process of the present invention, the customer interview process begins once the service provider technology baseline is established. For example, if a customer is a small bank, the service provider can identify the industry vertical (financial) and market segment (small bank) for that customer. The service provider can interview a bank employee knowledgeable about the bank's technologies to discover the type of technologies the bank is currently using and what types of technologies the bank is interested in using in the future. For example, the bank may indicate using a DOS based system for all its computing, but wants to migrate to a WINDOWS system.

The service provider can then consult the service provider's account manager for that bank. The service provider can inform the account manager that the bank has DOS programs, but wants to move to a WINDOWS environment for each of those programs within the next year. The account manager can then decide, on a specific skill level, the number of WINDOWS application developers, integrators, systems management people, etc., who are needed, and the time frame they are needed, to meet the customer's desire to move to a WINDOWS based system within one year.

The service provider can then look through the technical profiles to find the technical profile for a WINDOWS application developer listing the skills needed for an application developer in WINDOWS. At that point, the service provider can use a software tool to search for candidates with certain skill levels with WINDOWS programming against the set of information that describes the candidates and their current skills loaded in the repository. The software tool can generate a report for candidates found in the search.

The candidates can then be targeted to particular technical profiles such as a WINDOWS application programmer. If the candidate targeted as a WINDOWS developer needs further skill development to meet the needs of the bank, an individual development plan can be created listing the development activities needed and when those activities are to be accomplished. The completion of the individual development plan should occur prior to the time the bank needs the WINDOWS application developer.

The repository of data in combination with a predictive resource planning software tool, according to the present invention, can allow the predictive resource planning process to significantly reduce the time expended in predicting resources, identifying candidates, and developing those candidates to meet the customer technical resource requirements. Loading the service provider's technology baseline and the customer's technology direction allows the service provider to compare the service provider's technological abilities with the customer's technological requirements. This, in turn, allows the service provider to make a more accurate prediction of the technical resources the service provider should develop to meet the customer's business plans. This capability allows a service provider to better position itself to meet current and future customer personnel needs.

Once this prediction has been made, the service provider should locate within its employee base those employees that either have the technical skills, or can be trained to develop the technical skills to meet the customer's technical requirements. The repository of data allows the service provider to collect the technical skill of candidate employees. A software tool can allow the service provider to compare the skill levels of the employee candidates with the technical skills required to support the customer's business plan. The software tool can also search the candidates within the repository to locate candidates that have some or all of the skills required to support the customer's technology direction.

Once candidates have been identified and slotted to provide certain technical services, the service provider can train the candidates in any skills the candidates do not have within the time frame the customer requires those skills. This allows the service provider to re-skill candidates to the skill level required by the customer within the time frame needed. Through utilization of the predictive resource planning process, predictive resource planning repository, and predictive resource planning software tool, the service provider can anticipate and develop within its work force the technical skills required to meet its customers' technology resource requirements. The present invention allows the service provider to develop critical skills within the service provider's technical work force in the time frame needed by the customer.

Although the present invention has been described in detail, it should be understood that various changes, substitutions and alterations can be made hereto without departing from the spirit and scope of the invention as described by the appended claims.

What is claimed is:

1. A process for predictive resource planning by a service provider to meet a customer's predicted technical resource requirements, the process implemented using a computer having a data storage device for storing data in a data base repository, and the process comprising:

determining a technology baseline of a service provider and storing data representing the technology baseline in the data base repository;

determining a technology direction for the customer and storing data representing the customer technology direction in the data base repository;

predicting technical resource requirements for servicing the customer based upon the technology direction of the customer and storing the technical resource requirements in the data base repository;

documenting a plurality of candidates' technical skill levels and storing the plurality of candidates' technical skill levels in the data base repository;

selecting candidates for providing the predicted technical resource requirements;

creating an individual development plan to develop skills of selected candidates as needed to provide the predicted technical resource requirements; and implementing each individual development plan in order to develop the skills of the selected candidates such that the service provider can develop a collection of trained candidates to meet the predicted technical resource requirements of the customer.

2. The process of claim 1 further comprising:

comparing the technology baseline data with the technology direction data to identify technical profiles appropriate to the technology direction of the customer;

assessing the skill level of the candidates prior to selecting the candidates; and identifying a time period within which each individual development plan should be completed in order to provide each candidate with the appropriate skills to allow the service provider to provide the predicted technical resource requirements to the customer.

3. The process of claim 2, wherein more than one of the steps of determining a technology baseline, determining a technology direction, predicting technical resource requirements, documenting a candidate's technical skill levels, selecting candidates, creating an individual development plan, implementing each individual development plan, comparing the technology baseline, assessing the skill level, and identifying a time period are performed by a computer.

4. The process of claim 1, further comprising:

evaluating the process to determine ways to improve the process.

5. The process of claim 1, further comprising:

periodically updating the service provider's technology baseline; and periodically updating the customer's technology direction.

6. The process of claim 1, wherein determining the technology baseline comprises:

identifying technical skills of personnel within the service provider and identifying technical skills required for technologies prevalent in the service provider's industry to establish the service provider's technology baseline; and linking the technical skills identified to a plurality of generic technical profiles, the generic technical profiles each containing a set of skills defining that technical profile.

7. The process of claim 1, wherein determining a technology direction for the customer comprises:

identifying technologies currently in use by the customer and storing data representing current customer technologies in the repository; and identifying technologies the customer anticipates using in the future and storing data representing future customer technologies in the repository.

8. The process of claim 1, wherein predicting technical resource requirements comprises:

determining technical skills required to support the customer's technology direction;

linking the technical skills required to support the customer's technical direction to a plurality of technical profiles contained within the repository to create a plurality of customer technical profiles; and predicting a number of technical resources needed to support the customer technical profiles.

9. The process of claim 1, wherein selecting candidates comprises:

inputting into a computer a set of search criteria defining a search of the candidates, the search criteria selected to match a candidate to a customer technical resource requirement;

performing a computer search based on the search criteria, the computer search generating candidates meeting the search criteria; and targeting a candidate to a customer technical profile based on the search results.

10. The process of claim 1, wherein creating an individual development plan comprises:

identifying skills a candidate must develop in order to satisfy skills in a targeted technical profile and storing the identified skills needing development in the repository in an individual development plan for the candidate;

providing development activities to develop the identified skills and storing data defining that development activity in the repository; and identifying a time frame within which a candidate must complete each development activity in order to meet the customer's technical resource requirements.

11. The process of claim 1, wherein implementing each individual development plan comprises:

reviewing all individual development plans to determine what identified skills must be developed in each and to determine what development activities should occur;

scheduling development activities according to the review;

registering candidates for the scheduled development activities; and executing the scheduled development activities to develop the skills necessary for a candidate to meet a target technical profile.

12. A system for predictive resource planning by a service provider to meet a customer's predicted technical resource requirements, the system comprising:

a computer having a data storage device for containing a repository of data, the data base repository containing;

a technology baseline for the service provider;

a plurality of generic technical profiles, each technical profile defining a set of skills;

a technology direction for the customer, the technology direction including the technologies current in use by the customer, technologies the customer plans to use in the future, and a time frame in which to implement the technology direction;

skill levels of candidates available for targeting to a customer technical profile;

development activities to develop a candidate to meet a customer technical profile; and a software program executed by the computer for manipulating data contained within the repository, the software program operable to:

compare the service provider's technology baseline with the customer's technology direction to identify the technical profiles required to meet the customer's technology direction, thereby creating a plurality of customer technical profiles;

search candidates' skill levels according to criteria selected by a user to identify candidates to target to a customer technical profile;

create an individual development plan, including a development activity, for each candidate that requires development to meet the customer technical profile to which the candidate is targeted; and create a schedule for executing the development activities in order to provide candidates targeted to a customer technical profile within the customer's time frame.

13. The system of claim 12, wherein the software program is further operable to:

deploy the data base repository to remote data storage sites; and merge repository information from multiple remote sites.

14. The system of claim 12, wherein the software program is operable to identify candidates by:

accessing a set of search criteria defining a search of the candidates, the search criteria selected to match a candidate to a customer technical resource requirement;

performing a search based on the search criteria, the computer search generating candidates meeting the search criteria; and targeting a candidate to a customer technical profile based on the search results.

15. The system of claim 12, wherein the software program is operable to create an individual development plan by:

identifying skills a candidate must develop in order to satisfy skills in a targeted technical profile and storing the identified skills needing development in an individual development plan for the candidate;

providing development activities to develop the identified skills and storing data defining that development activity; and identifying a time frame within which a candidate must complete each development activity in order to meet the customer's technical resource requirements.

16. A system for predictive resource planning directed by a computer program, the system comprising:

a data storage device operable to store a computer program and data input by a user to create a data base repository;

an input/output device coupled to the processor providing an interface allowing the input of information into the data base repository;

a processor coupled to the data storage device operable to execute the computer program for;

predicting technical resource requirements for servicing the customer based upon a technology direction of the customer and storing the technical resource requirements in the data base repository;

selecting candidates for providing the technical resource requirements based on the candidates' skill levels related to the customer's technical resource requirements; and creating an individual development plan to develop skills of selected candidates as required to provide the technical resource requirements;

the individual development plan thereby providing a means for developing the skills of the selected candidates such that the service provider can develop a collection of trained candidates with the skills to meet the predicted technical resource requirements of the customer.

17. The system of claim 16, wherein the processor is operable to execute the computer program for:

deploying the data base repository to remote data storage sites; and merging repository information from multiple remote sites.

18. The system of claim 16, wherein the processor is operable to execute the computer program for selecting candidates by:

accessing a set of search criteria defining a search of the candidates, the search criteria selected to match a candidate to a customer technical resource requirement;

performing a search based on the search criteria, the computer search generating candidates meeting the search criteria; and targeting a candidate to a customer technical profile based on the search results.

19. The system of claim 16, wherein the processor is operable to execute the computer program for creating an individual development plan by:

identifying skills a candidate must develop in order to satisfy skills in a targeted technical profile and storing the identified skills needing development in an individual development plan for the candidate;

providing development activities to develop the identified skills and storing data defining that development activity; and identifying a time frame within which a candidate must complete each development activity in order to meet the customer's technical resource requirements.

* * * * *